United States Patent
Homer et al.

(10) Patent No.: US 7,426,643 B2
(45) Date of Patent: Sep. 16, 2008

(54) INPUT DEVICE FEATURE

(75) Inventors: Steven S. Homer, Tomball, TX (US); James Scott Love, Magnolia, TX (US); Valiuddin Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 10/873,053

(22) Filed: Jun. 22, 2004

(65) Prior Publication Data

US 2006/0005023 A1 Jan. 5, 2006

(51) Int. Cl.
*H04L 9/32* (2006.01)
(52) U.S. Cl. .................................... 713/186
(58) Field of Classification Search ............ 726/7, 726/6, 5, 19, 18, 17, 26, 29–30; 713/186
See application file for complete search history.

(56) References Cited

U.S. PATENT DOCUMENTS

| | | | |
|---|---|---|---|
| 4,883,926 A | 11/1989 | Baldwin | 178/19.01 |
| 5,384,688 A | 1/1995 | Rockwell | 361/736 |
| 5,654,529 A | 8/1997 | Yeung et al. | 178/19.03 |
| 5,812,865 A * | 9/1998 | Theimer et al. | 709/228 |
| 6,050,490 A * | 4/2000 | Leichner et al. | 235/462.49 |
| 6,188,392 B1 * | 2/2001 | O'Connor et al. | 345/179 |
| 6,195,446 B1 | 2/2001 | Skoog | 382/119 |
| 6,307,956 B1 | 10/2001 | Black | 382/124 |
| 6,539,101 B1 | 3/2003 | Black | 382/124 |
| 6,556,694 B2 | 4/2003 | Skoog | 382/119 |
| 6,563,939 B1 | 5/2003 | Chai | 382/119 |
| 6,703,633 B2 * | 3/2004 | Tullis | 250/556 |
| 6,925,565 B2 * | 8/2005 | Black | 713/186 |
| 7,082,444 B2 * | 7/2006 | Braun et al. | 707/203 |
| 7,110,576 B2 * | 9/2006 | Norris et al. | 382/119 |
| 7,278,017 B2 * | 10/2007 | Skantze | 713/168 |
| 2002/0133418 A1 * | 9/2002 | Hammond et al. | 705/26 |
| 2003/0209604 A1 * | 11/2003 | Harrison, Jr. | 235/462.44 |
| 2004/0015704 A1 * | 1/2004 | De Schrijver | 713/186 |
| 2004/0233039 A1 * | 11/2004 | Beenau et al. | 340/5.83 |
| 2005/0013103 A1 * | 1/2005 | Chandley | 361/683 |

OTHER PUBLICATIONS

RSA Laboratories, "3.6.1 What is Diffie-Hellman?", http://www.rsasecurity.com/rsalabs/node.asp?id=2248, Home: Crypto FAQ: Chapter 3 Techniques in Cryptography: 3.6 Other Cryptographic Techniques,(2004),Web Site.

* cited by examiner

*Primary Examiner*—Matthew B Smithers

(57) ABSTRACT

An input device includes a security feature to transmit information to a corresponding system.

27 Claims, 3 Drawing Sheets

INPUT DEVICE FEATURE

BACKGROUND

An input device is often used to input data into a host system.

DETAILED DESCRIPTION

Figure 1:
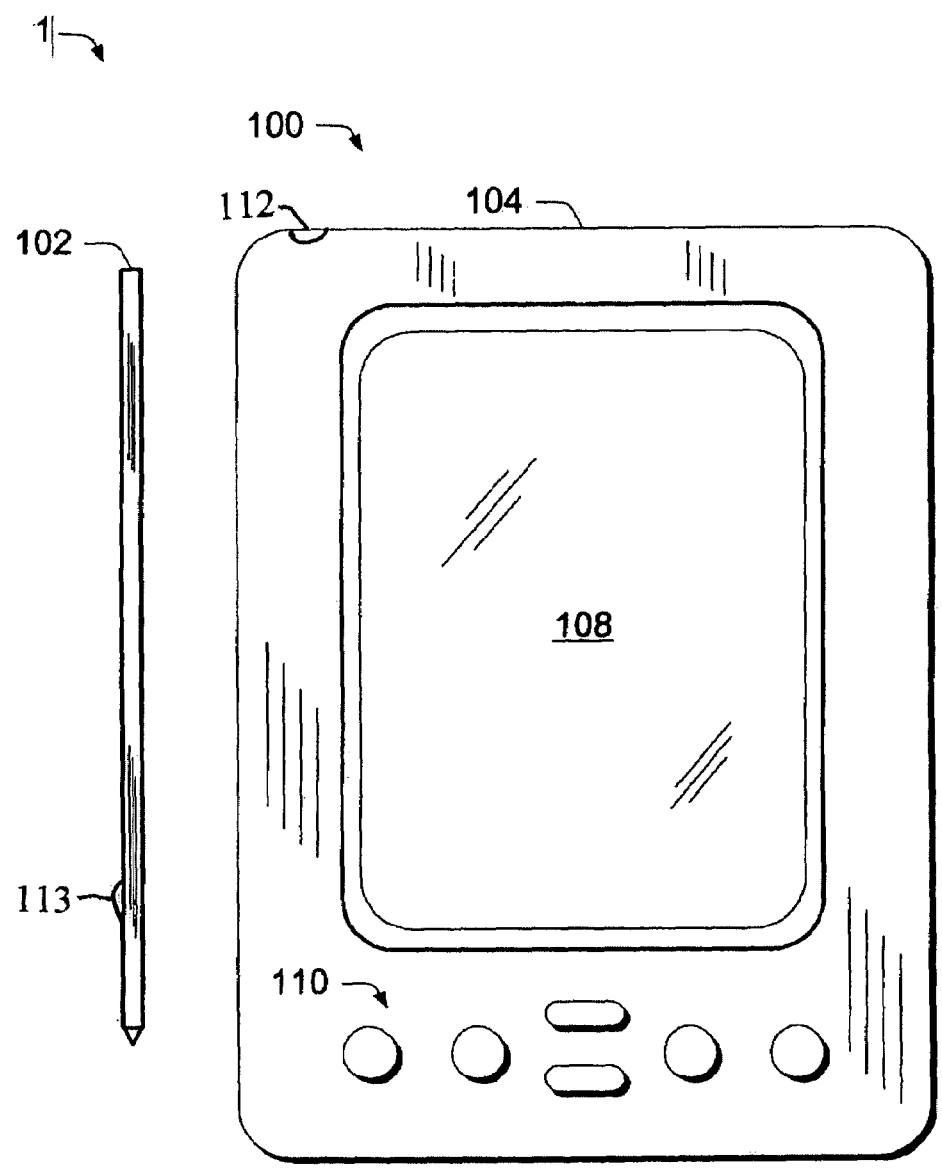
FIG. 1 illustrates a host system and an input device according to an embodiment.

FIG. 1 illustrates an electronic system 1, such as a computer system. In an embodiment, the electronic system 1 includes a host system 102, such as a Personal Digital Assistant (PDA), and a corresponding input device 102, such as a stylus.

The host system 100 includes a housing 104. The housing 104 includes a display 108, such as a touch screen, and various user-engagable buttons 110. A user may use the buttons 110 to interact with the host system, and/or the input device 102 to physically engage the display 108. The housing 104 includes an input device dock 112, in an embodiment. The input device 102 includes a switch 113, in an embodiment.

Figure 2:
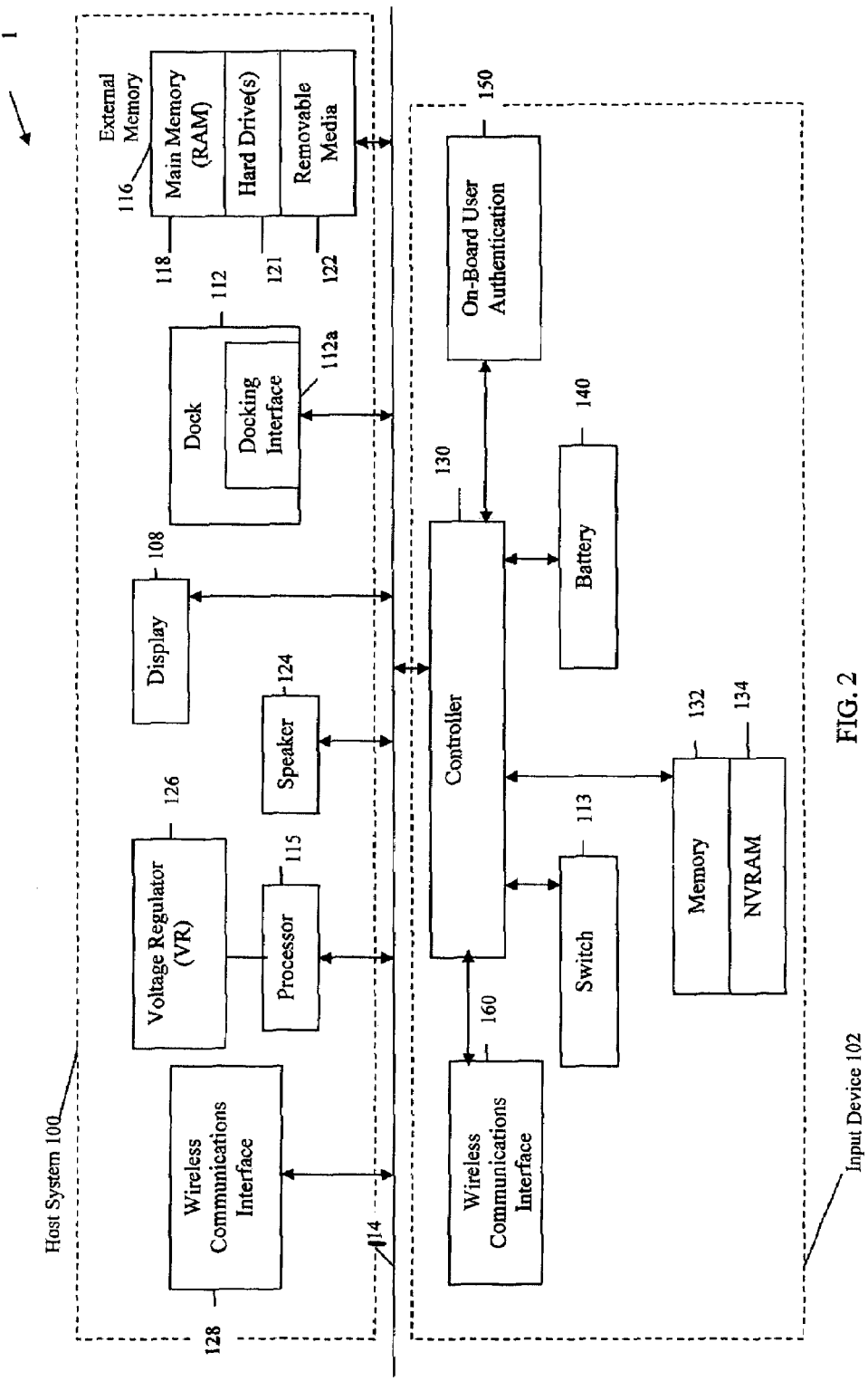
FIG. 2 illustrates a block diagram of an embodiment of an electronic system that includes an input device.

FIG. 2 illustrates a block diagram of the electronic system 1. In an embodiment, the host system 100 may be coupled to the input device 102 via a system bus 114.

Host System

The host system 100 includes a processor 115 which is electrically coupled to various components in the system 1 via the system bus 114. Processor 115 may include a microelectronic device, a semiconducting device, a microprocessor, a microcontroller, a graphics processor or a digital signal processor, memory, flash memory and/or a custom circuit or an application-specific integrated circuit, such as a communications circuit and similar electronic systems. The system bus 114 may be a single bus or any combination of buses.

The host system 100 may also include an external memory 116 that in turn includes one or more memory elements suitable to the particular application. In an embodiment, the memory 116 includes substantially unique information with regard to the corresponding input device 102. In an embodiment, the memory 116 includes at least one of a main memory (RAM) 118, a hard drive 121, and a removable media 122. The host system 100 may also include the following components: the dock 112, the display 108, a speaker 124, and a voltage source 126 that is electrically coupled to processor 115. The voltage source 126 may be used to supply power to the semiconducting processor 115. In an embodiment, a wireless communications interface 128 is coupled with the bus 114 and associated with the processor 115. In an embodiment, the dock 112 includes a location to place the input device 102. In an embodiment, the dock 112 includes a docking interface 112a that couples to the bus 114, and is capable of interfacing with the input device 102. The input device 102 may be placed in the dock 112 to store the input device 102, to recharge the input device 102, to authenticate the input device 102, to log in the user, and/or to authenticate the host system 100. In an embodiment, when the input device at least one of hovers near and/or taps on and/or docks into the dock 112, the host system 100 requests security information from the input device 102, such as a security code, as discussed in more detail below.

Input Device

The input device 102 may include a keyboard, mouse, trackball, game controller, microphone, voice-recognition device, a writing device including a digital pen or a stylus, or any other device that inputs information into the host system 100.

In an embodiment, the input device 102 may include at least one of a controller 130 coupled with the bus 114, a memory 132, the switch 113, a battery 140, an on-board user authentication 150, and a wireless communications interface 160. The battery 140, in an embodiment, provides power to the input device 102, and may be rechargeable.

In an embodiment, the memory 132 includes a non-volatile random access memory 134 (NVRAM) that is programmed with pairing information to match the host system to the corresponding input device. In an embodiment, the memory 132 of the input device includes substantially unique information of the corresponding host system. In an embodiment, substantially unique information of the host system includes a secure characteristic. In an embodiment, the secure characteristic includes authentication information, such as at least one of a security code, a password, and a serial number. In an embodiment, the host system includes registered information of the corresponding input device 102. In an embodiment, the corresponding input device 102 includes registered information of the host system. In an embodiment, the registered information of the input device 102 is substantially unique and the registered information of the host system is substantially unique. In an embodiment, the registered information is pairing information for the host system and the corresponding input device. In an embodiment, the registered information of the host system is authentication information. In an embodiment, the registered information of the input device 102 is authentication information.

In an embodiment, an application sends signals to the input device 102 to securely store authentication information in the memory of the input device 102 and/or the host system. In an embodiment, the input device 102 is programmed with a digital sequence which would act at the login to the host system. In embodiments, the input device 102 may be programmed when coupled to the docking interface 112a of the dock 112, or may be programmed wirelessly through the wireless communication interfaces 128, 160.

The wireless communications interface 160 allows the input device 102 to communicate with the wireless communications interface 128. In an embodiment, the wireless interfaces 128, 160 form at least a part of a wireless communication system. In an embodiment, the interfaces 128, 160 are input/output (I/O) interfaces configured to provide a communication channel between the input device 102 and the host system.

In an embodiment, the input device 102 includes a hand-held device that enters and/or displays handwritten data directly onto the display 108. The handwritten data may be entered onto a display or surface (not shown) that is different than the display 108 where the data is displayed. In an embodiment, the hand-held writing device allows handwritten or freestyle stroke input. The hand-held device is not limited to receiving data generated by human hands; for example, machine generated data may also be inputted and accepted. Various shapes and designs of configuring the input device to correspond with a finger or a hand are within the scope of this disclosure.

In an embodiment, in addition to data input or to handwriting, at least one feature is supported by the input device 102. In an embodiment, the feature includes the switch 113. In an embodiment, the switch 113 logs out and/or logs in the user. In an embodiment, the input device 102 includes the switch 113 to activate login of the predetermined user to the corresponding host system. In an embodiment, the switch 113 includes a button. In an additional embodiment, the switch includes a plurality of buttons. In an additional embodiment, the switch includes a multi-state switch and/or a rigger switch. In an embodiment, the host system includes a predetermined knowledge of the switch. In an embodiment, the host system interfaces with the input device to dynamically determine the switch and the function(s) of the switch, and responds accordingly. In an embodiment, the switch 113 includes a toggle switch. In an embodiment, the switch 113 is activated to color and/or change a color of the handwritten data. In an embodiment, the switch 113 is activated to highlight. In an embodiment, the switch 113 is activated to insert symbols, such as musical symbols. In an embodiment, the switch 113 transmits signals interpreted by the processor 115 to command tasks other than data input. In an embodiment, the at least one feature of the input device 102 includes a security feature. In an embodiment, the security feature transmits authentication information to a corresponding host system. In an embodiment, the security feature includes the switch 113 and a communication link (i.e. the bus 114) that transmits the secure characteristic to the host system and verifies predetermined data from the host system.

In an embodiment, the at least one feature of the input device 102 performs a function other than data input. In an embodiment, the function includes at least one of login, logout, and mode selection. In an embodiment, the function includes automatically logging in an authorized user to the host system. In an embodiment, the function includes capability of logging into the corresponding host system 100.

In an embodiment, the at least one function includes the capability to launch a software application within the host system 100. In an embodiment, the function includes the capability to launch a specific action within a software application. In an embodiment, the switch 113 may be operated to launch the software application or to launch the specific action in the application.

In an embodiment, the software application is a painting program. In an embodiment, the software application is a word processing program. In an embodiment, the application is aware of the input device 102 and is responsive to the input device 102, and in a particular embodiment, responsive to the switch 113 and/or to the on-board user authentication 150. In an embodiment, upon activation of the switch 113, the application queries a mode of the input device and then launches and/or performs a specific action related to the mode. In an embodiment, the application permits the user to select the action to take when the switch 113 is triggered.

In an embodiment, the input device 102 is a key to unlock the device 102 when in a locked state. In an embodiment, the host system is in an unlocked state when a user is logged in to the host system. In an embodiment, the switch 113 on the input device 102 may operate to unlock the host system.

In an embodiment, the at least one feature of the input device includes the on-board user authentication 150. In an embodiment, a user identity is verified by the input device 102. In an embodiment, the user identity is verified before the input device 102 interacts with the host device. In an embodiment, the user identity is verified with a fingerprint sensor on the pen. In an embodiment, the identity of the user is predetermined and stored in the memory 132 of the input device 102. In an embodiment, the fingerprint sensor compares a fingerprint of the user with a stored fingerprint. In an embodiment, the user identity is verified using any cryptographic token, and/or any biometric method, such as speech recognition or retina scan.

Figure 3:
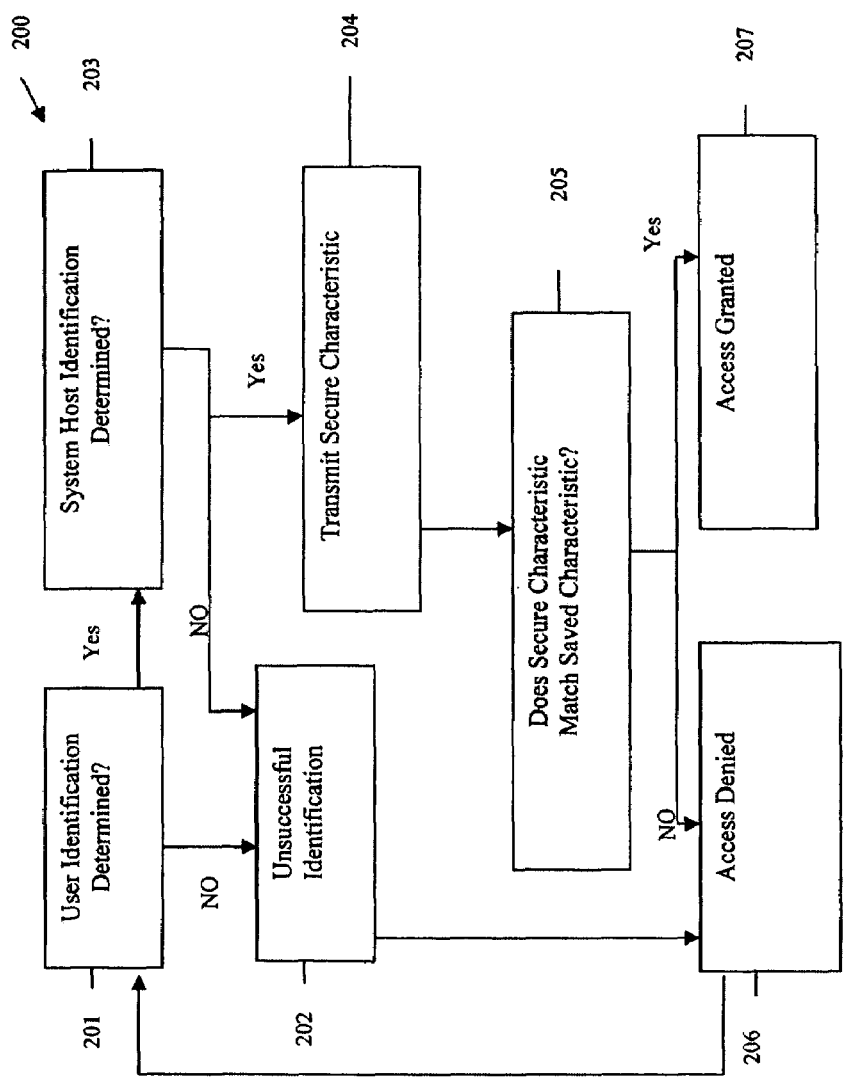
FIG. 3 is a flow chart illustrating a method to access the system of FIG. 2, in an embodiment.

FIG. 3 is a flow chart 200 illustrating a method to access the host system 100 of FIG. 2, in an embodiment. At 201, the user identification is determined. In an embodiment, the input device 102 attempts identification of the predetermined user through the on-board user authentication 150. In an embodiment, the input device 102 includes the on-board user authentication 150 to identify the predetermined user before the input device 102 transmits authentication information to the corresponding host system. In an embodiment, there is no on-board user authentication 150 or the authentication 150 is disabled.

At 202, the identification is unsuccessful, and access to the host system 100 is denied. In an embodiment, denied access includes failure to log the user in to the host system 100. In an embodiment, the identification of the user is unsuccessful in that the input device 102 does not recognize the user.

At 203, the predetermined user is identified, and the host system identification is determined. In an embodiment, the identification of the user is successful in that the input device 102 recognizes the user. In an embodiment, before verifying the host system, the input device identifies and/or authorizes the predetermined user. In another embodiment, determining user identification 201 is not performed, and the host system identification is determined.

In an embodiment, at 202, the identification is unsuccessful, and access to the host system 100 is denied. In an embodiment, the identification of the host system is unsuccessful in that the input device 102 does not recognize the host system.

At 204, the predetermined host system is identified, and the secure characteristic is transmitted. In an embodiment, the identification of the host system is successful in that the input device 102 recognizes the host system. In an embodiment, the secure characteristic is transmitted from the input device 102 to the host system.

At 205, after 204, the host system detects and attempts to match the secure characteristic with a saved characteristic. In an embodiment, the host system includes the saved characteristic that corresponds with the particular input device. In an embodiment, the saved characteristic includes registered information of the corresponding input device stored in the memory 116 of the host system 100. In an embodiment, the host system is predetermined according to the input device 102, and/or the input device is predetermined according to the host system. In an embodiment, the host system requests registered information from the input device 102, and the input device 102 responds back with a series of signals which include the secure characteristic. This secure characteristic is compared with the saved characteristic on the host system.

At 206, the secure characteristic does not match the saved characteristic, and the access to the host system is denied.

At 207, the secure characteristic matches the saved characteristic, and the user is granted access to the system 100. In an embodiment, the host system successfully matches the secure characteristic with the saved characteristic of the input device 102, and the user is automatically logged in to the system. In an embodiment, there is a handshake between the input device and the host system. In an embodiment, the secure characteristic matching includes verifying a pen-system pair, wherein each of the pen and host system verifies information regarding the other. In an embodiment, verifying the pen-system pair includes verifying more than one input device associated with the host system. For example, there are multiple pairs to verify including pen1-system1 pair, pen2-system1 pair, and pen1-system2 pair.

In an embodiment, authentication information is transmitted from the input device of the pen-system pair to the corresponding host system of the pen-system pair to verify the information. Then, in an embodiment, authentication information is transmitted from the host system of the pen-system pair to the corresponding input device of the pen-system pair to verify the information. In another embodiment, first the host system transmits the information, and then upon verification, the input device 102 transmits information back to the host system. In an embodiment, upon verification from the pair, the host system is unlocked and/or the user logs in to the system 100.

The host system detects and matches the transmitted secure characteristic of the input device with the saved characteristic using a secure session key exchange mechanism, e.g. using a crypto protocol. There are generally two types of crypto protocols. Symmetric Key based protocols and Asymmetric (a.k.a. RSA) key based protocols. Asymmetric key cryptography is substantially secure but slow compared with the symmetric key cryptography. Symmetric key based protocols are substantially fast and substantially efficient but are based on a shared (single) secret key that is often exchanged or established between interested parties over insecure (internet, email, phone call, etc) mediums.

In an embodiment, the crypto protocol includes a symmetric key-based protocol that allows exchange of a secret key over an insecure medium without any prior secrets. In an embodiment, this protocol is the Diffie-Hellman key agreement protocol (also called exponential key agreement). See http://www.rsasecurity.com/rsalabs/faq/3-6-1.html. In the authenticated Diffie-Hellman key agreement protocol, or Station-to-Station (STS) protocol, immunity from man-in-the-middle attacks is achieved by allowing authentication to each station (or system or device) by the use of digital signatures and/or public-key certificates and other protocol variants.

FIGS. 1 to 2 are merely representational and are not drawn to scale. Certain proportions thereof may be exaggerated, while others may be minimized. Many other embodiments will be apparent to those of skill in the art upon reviewing the above description. The host system 100 can be implemented in a number of different embodiments. The elements, materials, geometries, dimensions, and sequence of operations can all be varied to suit particular applications. Parts of some embodiments may be included in, or substituted for, those of other embodiments. Various embodiments also could be used in conjunction with various types of electronic assemblies and is not meant to be limited in use.

The illustrations of embodiments described herein are intended to provide a general understanding of the structure of various embodiments, and they are not intended to serve as a complete description of all the elements and features of apparatus and systems that might make use of the structures described herein. Applications that may include the apparatus and systems of various embodiments include various electronic systems such as televisions, printers, electronic displays, cellular telephones, high speed and personal computers, personal digital assistants (PDAs), workstations, radios, video players, vehicles, and others.

The accompanying drawings that form a part hereof show by way of illustration, and not of limitation, specific embodiments in which the subject matter may be practiced. Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of embodiments herein may be made without departing from the principles and scope of embodiments as expressed in the subjoined claims.

The invention claimed is:

1. A method comprising:
   verifying a predetermined system with a predetermined input device;
   transmitting a secure characteristic from the predetermined input device to the predetermined system;
   providing display data to the predetermined system by a user of the predetermined input device; and
   activating a switch on the predetermined input device to perform a function other than data input, the function including at least one of launching an application, launching an action with an application, logging in to the predetermined system, logging out of the predetermined system, and mode selection of the predetermined system.

2. The method of claim 1 wherein the system logs in a user upon detecting and matching the secure characteristic with a saved characteristic.

3. The method of claim 1 wherein before verifying the system, the input device identifies a predetermined user.

4. The method of claim 3 wherein the input device identifies the predetermined user with an on-board user authentication.

5. A method comprising:
   verifying a pen-system pair;
   transmitting authentication information from a pen of the pen-system pair to a corresponding system of the pen-system pair; and
   activating a switch on the pen to perform a function other than data input.

6. The method of claim 5 further comprising verifying a user identity before verifying the pen-system pair.

7. The method of claim 6 further comprising verifying the user identity with a fingerprint sensor on the pen.

8. The method of claim 5 further comprising storing on the system registered information of the corresponding pen.

9. The method of claim 8 wherein verifying the pen-system pair further comprises detecting and matching a characteristic from the corresponding pen with a system-saved pen characteristic.

10. The method of claim 5 wherein the function includes at least one of launching an application, launching an action with an application, logging in to the system, logging out of the system, and mode selection of the system.

11. A system comprising:
a host system having authentication information of a corresponding input device; and
the corresponding input device having authentication information of the host system;
wherein the input device is usable by a user to cause information to be displayed on the host system; and
wherein the input device comprises a switch that is activated by a user to perform a function including at least one of launching an application, launching an action with an application, logging in to the system, logging out of the system, and mode selection of the system.

12. The system of claim 11 wherein the host system is locked, and the corresponding input device is a key to unlock the host system.

13. The system of claim 11 wherein the authentication information of the input device is unique and wherein the authentication information of the host system is unique.

14. The system of claim 11 and further comprising a wireless communication system coupled to the host system and corresponding input device.

15. The system of claim 11 wherein the authentication information includes at least one of a security code, a password, and a serial number.

16. The system of claim 11 wherein the host system includes an input device dock to automatically transmit the authentication information.

17. A method comprising:
automatically verifying that a stylus is permitted to access a host system and logging into the host system using a switch provided on the stylus; and
activating the switch to perform a function including at least one of launching an application, launching an action with an application, logging out of the host system, and mode selection of the host system.

18. The method of claim 17 wherein automatically verifying the stylus and logging into the host system includes activating the switch on the stylus.

19. The method of claim 17 wherein automatically verifying the stylus and logging into the host system includes verifying predetermined data from the host system and transmission of a secure characteristic from the stylus to the host system.

20. The method of claim 17 wherein automatically verifying the stylus and logging into the host system includes docking the stylus into the host system.

21. An input device comprising:
a security feature including authentication information to transmit to a corresponding host system, said authentication information comprising at least information about the corresponding host system that is usable to verify the input device to the host system;
an on-board user authentication device to authenticate a predetermined user; and
a switch that, when activated, causes a function to be performed, the function comprising at least one of launching an application, launching an action with an application, logging out of the host system, and mode selection of the host system.

22. The input device of claim 21 wherein the authentication information includes at least one of a security code, a password, and a serial number to transmit to the corresponding host system.

23. The input device of claim 21 wherein the switch activates login of a predetermined user to the corresponding host system.

24. The input device of claim 21 wherein the input device includes a memory with unique information of the host system.

25. The input device of claim 24 wherein the unique information of the host system includes the authentication information.

26. The input device of claim 21 wherein the input device includes at least one of a digital pen and a stylus.

27. An input device comprising:
means for storing authentication information for use in authenticating the input device to a host system;
means for data input;
and a switch that perform a function selected from a group consisting of launching an application, launching an action within an application, logging in to the host system, logging out of the system, and mode selection of the host system.

* * * * *

UNITED STATES PATENT AND TRADEMARK OFFICE
CERTIFICATE OF CORRECTION

PATENT NO. : 7,426,643 B2
APPLICATION NO. : 10/873053
DATED : September 16, 2008
INVENTOR(S) : Steven S. Homer et al.

It is certified that error appears in the above-identified patent and that said Letters Patent is hereby corrected as shown below:

In column 8, line 42, in Claim 27, insert -- host -- before "system".

Signed and Sealed this

Twenty-seventh Day of January, 2009

JOHN DOLL
*Acting Director of the United States Patent and Trademark Office*